(12) United States Patent
Tate et al.

(10) Patent No.: US 12,451,546 B2
(45) Date of Patent: Oct. 21, 2025

(54) POWER STORAGE APPARATUS

(71) Applicant: HONDA MOTOR CO., LTD., Tokyo (JP)

(72) Inventors: Ryu Tate, Saitama (JP); Shoshi Hidaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1249 days.

(21) Appl. No.: 17/209,176

(22) Filed: Mar. 22, 2021

(65) Prior Publication Data

US 2021/0305649 A1    Sep. 30, 2021

(30) Foreign Application Priority Data

Mar. 27, 2020  (JP) ................................ 2020-057227

(51) Int. Cl.
  *H01M 50/207*   (2021.01)
  *H01M 10/6554*  (2014.01)
  *H01M 50/233*   (2021.01)
  *H01M 50/262*   (2021.01)

(52) U.S. Cl.
  CPC ..... *H01M 50/207* (2021.01); *H01M 10/6554* (2015.04); *H01M 50/233* (2021.01); *H01M 50/262* (2021.01)

(58) Field of Classification Search
  None
  See application file for complete search history.

(56) References Cited

U.S. PATENT DOCUMENTS

2016/0111691 A1*  4/2016  Garascia ............. H01M 10/613
                                                     429/100
2020/0251768 A1*  8/2020  Tajima ............... H01M 10/0481

FOREIGN PATENT DOCUMENTS

JP        2015230765 A      12/2015
JP        2020013750 A       1/2020

* cited by examiner

*Primary Examiner* — Maria Laios
(74) *Attorney, Agent, or Firm* — CKC & Partners Co., LLC

(57) ABSTRACT

A power storage apparatus includes: a tubular casing extending in a first direction; a cell group configured by stacking a plurality of battery cells in the first direction; opening parts arranged at both ends of the tubular casing in the first direction; a housing part arranged inside the tubular casing and housing the cell group; an end plate fixed to the tubular casing so as to close the opening party; and a reinforcement member fixed across the tubular casing and the end plate, wherein one end part of the reinforcement member is fixed to a first fixation part provided on an outer wall part, of the tubular casing, the outer wall part being arranged in a second direction perpendicular to the first direction, and another end part of the reinforcement member is fixed to a second fixation part provided on an outer part of the end plate.

7 Claims, 11 Drawing Sheets

POWER STORAGE APPARATUS

This application is based on and claims the benefit of priority from Japanese Patent Application No. 2020-057227, filed on 27 Mar. 2020, the content of which is incorporated herein by reference

BACKGROUND OF THE INVENTION

Field of the Invention

The present invention relates to a power storage apparatus.

Related Art

In hybrid cars and electric vehicles, a power storage apparatus is mounted which has a plurality of battery cells such as lithium ion secondary batteries. In general, these vehicles require more electric power than ordinary vehicles such as gasoline cars, and hence, many battery cells need to be highly densely implemented in a limited space.

There is conventionally known a power storage apparatus which enables a plurality of battery cells to be highly densely implemented in itself by housing, in a tubular casing, a cell group configured by stacking the plurality of battery cells in one direction (for example, see Patent Document 1). The tubular casing has opening parts, for inserting the cell group therethrough, arranged at both end parts which are along the direction of stacking the battery cells. The opening parts are closed by end plates fixed to the tubular casing.

Patent Document 1: Japanese Unexamined Patent Application, Publication No. 2020-13750

SUMMARY OF THE INVENTION

Battery cells rise in internal pressure due to their deterioration to expand. The expansion of the battery cells causes a cell group housed in a tubular casing to expand in the stacking direction. The expanding cell group presses end plates from the inside. This exerts a large load on the end plates. The end plates withstand this load by being strongly fastened to the tubular casing using bolts or the like, and thus, restrain the cell group from expanding.

Meanwhile, recent increase in electric power required for such a vehicle is still requiring increase in the number of battery cells stacked. It is therefore predicted that the load due to the expansion of the cell group acting on the end plates is going to increase further. There is a concern that an even larger load exerted on the end plates may give rise to deformation of the end plates.

Therefore, an object of the present invention is to provide a power storage apparatus capable of restraining an end plate from deforming due to a large load acting thereon caused by the expansion of a cell group.

(1) There is provided a power storage apparatus according to the present invention (for example, a power storage apparatus 1 mentioned later), including: a tubular casing (for example, a tubular casing 2 mentioned later) extending in a first direction (for example, a D1 direction mentioned later); a cell group (for example, a cell group 3 mentioned later) configured by stacking a plurality of battery cells (for example, battery cells 31 mentioned later) in the first direction; opening parts (for example, opening parts 20a mentioned later) arranged at both ends of the tubular casing in the first direction; a housing part (for example, a housing part 20 mentioned later) arranged inside the tubular casing and housing the cell group; an end plate (for example, end plates 4 and 5 mentioned later) fixed to the tubular casing so as to close the opening part; and a reinforcement member (for example, a reinforcement member 6 mentioned later) fixed across the tubular casing and the end plate, wherein one end part (for example, one end part 6a mentioned later) of the reinforcement member is fixed to a first fixation part (for example, a first fixation part 200 mentioned later) provided on an outer wall part (for example, an upper wall part 21 and a lower wall part 22 mentioned later), of the tubular casing, the outer wall part being arranged in a second direction (for example, a D2 direction mentioned later) perpendicular to the first direction, and another end part (for example, another end part 6b mentioned later) of the reinforcement member is fixed to a second fixation part (for example, a second fixation part 300 mentioned later) provided on an outer part (for example, a lateral face 4a mentioned later) of the end plate.

According to (1) above, the state where the tubular casing and the end plate are fastened together is reinforced by the reinforcement member, and hence, the reinforcement member can strongly restrain the end plate from deforming outward even when a large load due to the expansion of the cell group acts on the end plate. Accordingly, overexpansion of the cell group can be restrained and failure such as breakage of battery cells can be prevented from occurring.

(2) In the power storage apparatus according to (1), the first fixation part may be provided separately from the tubular casing, the outer wall part of the tubular casing may have a fastening member insertion hole (for example, a bolt insertion hole 27) through which a first fastening member (for example, a fastening bolt 8 mentioned later) fixing the end plate to the tubular casing is inserted along the first direction, and a fixation part accommodating groove (for example, a fixation part accommodating groove 28) communicating with the fastening member insertion hole and accommodating the first fixation part, the first fixation part may have a threaded engaging part (for example, first threaded engaging part 201 mentioned later) engaging with the first fastening member and may be fixed to the outer wall part by causing the first fastening member inserted through the fastening member insertion hole to threadedly engage with the threaded engaging part in a state where the first fixation part is accommodated in the fixation part accommodating groove.

According to (2) above, a fixation part for fixing the one end part of the reinforcement member can be easily made by fastening, in the fixation part accommodating groove, the first fixation part provided separately from the tubular casing to the end plate collectively with the first fastening member. This can eliminate a need for thickening the wall parts of the tubular casing, and hence, does not cause increases in the size and the weight of the tubular casing. The first fixation part can be easily assembled and taken apart since the first fixation part does not need to be fixed with an exclusive fastening member.

(3) In the power storage apparatus according to (1) or (2), the second fixation part may be arranged on a center line (for example, a center line X mentioned later) of the cell group in a third direction (for example, a D3 direction mentioned later) perpendicular to the first direction and the second direction.

According to (3) above, a place, of the end plate, which is on the center line is the place most liable to deform within the end plate since the center of the cell group in the third direction most strongly exerts the large load due to the expansion of the cell group on the end plate. By arranging the second fixation part at this place, the reinforcement member can effectively restrain the end plate from deforming when the large load due to the expansion of the cell group acts on the end plate.

(4) In the power storage apparatus according to any of (1) to (3), the tubular casing may have a partition wall part (for example, a partition wall part 24 mentioned later) inside connecting the two outer wall parts arranged in the second direction to extend in the first direction, and the first fixation part may be arranged at a place, on the outer wall part, overlapping the partition wall part.

According to (4) above, since within the outer wall part of the tubular casing, the place where the partition wall part is provided has an enough wall thickness as compared with the other places, a fixation part accommodating groove having an enough depth to accommodate the first fixation part can be easily formed there. This can prevent the tubular casing from being heavy since the fixation part accommodating groove can be formed without thickening the other wall parts of the tubular casing.

(5) In the power storage apparatus according to (4), two of the housing parts may be arranged side by side to sandwich the partition wall part, the reinforcement member may have the one end part and two of the other end parts corresponding to the two housing parts, and the reinforcement member may be formed in axial symmetry with the partition wall part as viewed from the second direction.

According to (5) above, since when the load is exerted on the end plate, moments substantially equally arise on the two other end parts of the reinforcement member, the reinforcement member is restrained from rotating. Therefore, the reinforcement member can strongly restrain the end plate from deforming.

(6) In the power storage apparatus according to (4) or (5), the partition wall part may have a temperature control medium channel (for example, temperature control medium channels 25 and 26 mentioned later) in which a temperature control medium flows in the first direction.

According to (6) above, the temperature of the battery cells in the tubular casing can be controlled with the temperature control medium flowing in the temperature control medium channel to maintain their appropriate temperature. Therefore, the progress of deterioration of the battery cells can be slowed and the battery cells can be restrained from expanding.

(7) In the power storage apparatus according to any of (1) to (6), the one end part of the reinforcement member may be fixed to the first fixation part with a second fastening member (for example, a reinforcement member fixation bolt 60 mentioned later), the other end part of the reinforcement member may have an engagement hole part (for example, an engagement hole part 63 mentioned later), and the second fixation part may have an engagement projection part (for example, an engagement projection part 302 mentioned later) that fixes the other end part by engaging with the engagement hole part of the reinforcement member.

According to (7) above, the other end part of the reinforcement member can be fixed with respect to the second fixation part simply by causing the engagement hole part to engage with the engagement projection part. Since use of an exclusive jig as in the case of bolt fastening is not necessary, the reinforcement member can be easily fixed across the end plate and the tubular casing simply by causing the reinforcement member fixation bolt to threadedly engage with the first fixation part, which realizes excellent workability.

(8) In the power storage apparatus according to any of (1) to (7), the second fixation part may be arranged on a lateral face (for example, a lateral face 4a mentioned later), of the outer part of the end plate, that is arranged in the same direction as a direction in which the outer wall part having the first fixation part is arranged.

According to (8) above, the reinforcement member can be formed into a flat plate shape and can be easily produced. Since when the load is exerted on the end plate, the reinforcement member only receives the force in its planar direction, it can strongly restrain the end plate from deforming due to the large load caused by the expansion of the cell group.

According to the present invention, there can be provided a power storage apparatus capable of restraining an end plate from deforming due to a large load acting thereon caused by the expansion of a cell group.

DETAILED DESCRIPTION OF THE INVENTION

Figure 1:
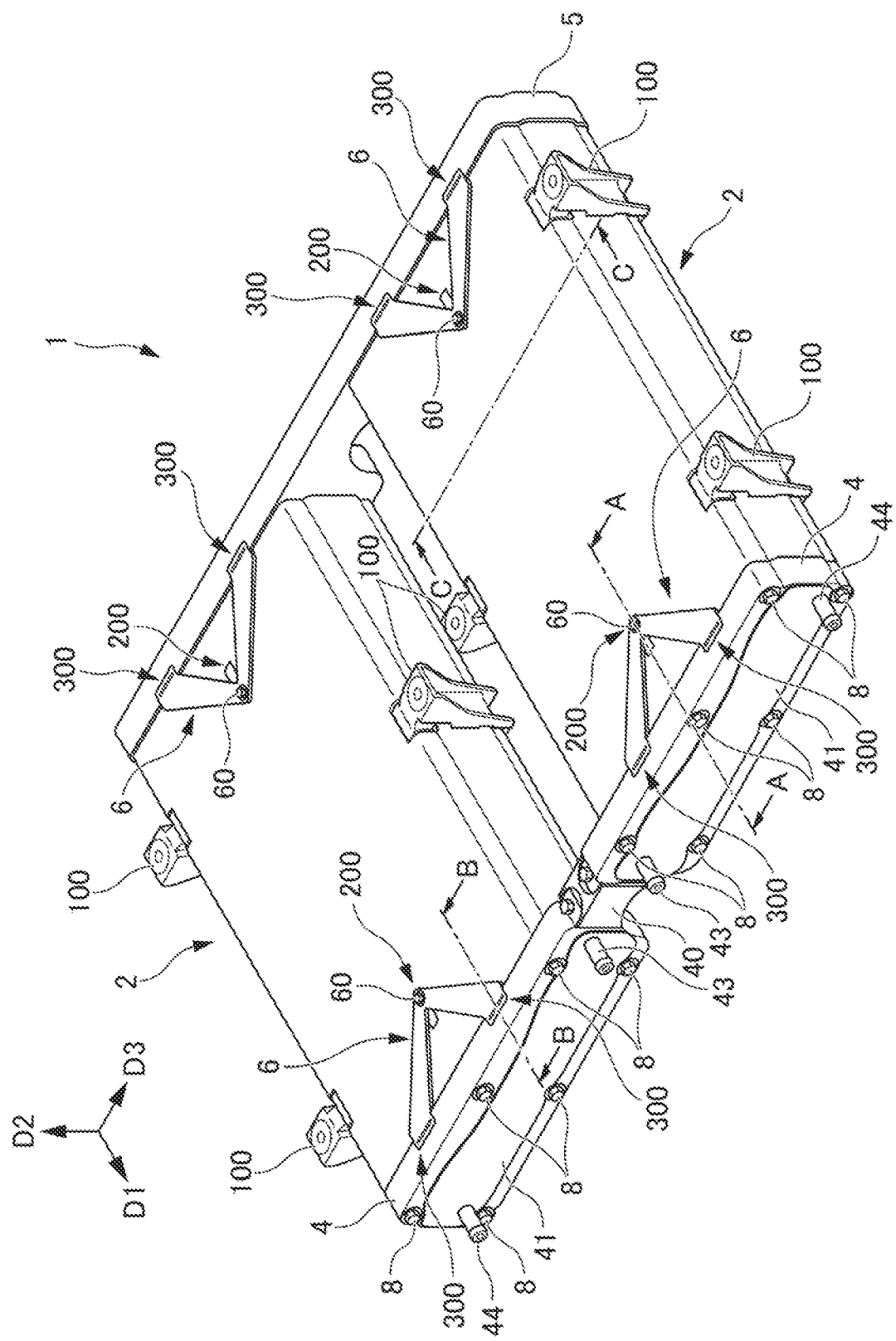
FIG. 1 is an overall perspective view showing a power storage apparatus according to an embodiment of the present invention.
Figure 2:
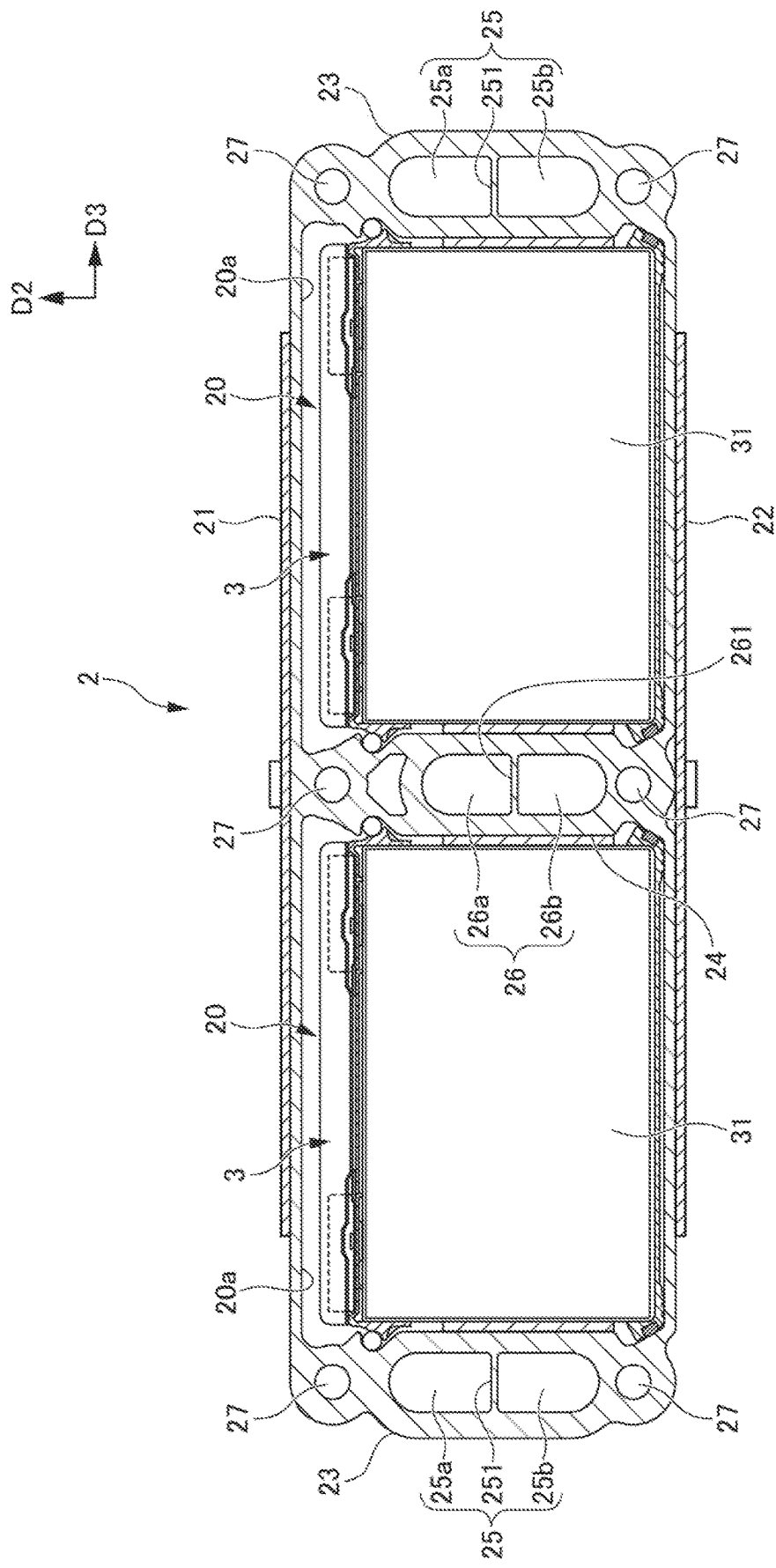
FIG. 2 is a sectional view taken along the C-C line in FIG. 1.

Hereafter, an embodiment of the present invention is described with reference to the drawings. As shown in FIG. 1 and FIG. 2, a power storage apparatus 1 has tubular casings 2, cell groups 3 housed in the tubular casings 2, end plates 4 and 5 and reinforcement members 6 fixed across the tubular casings 2 and the end plates 4 and 5.

Directions indicated by arrows in the drawings of the present specification are defined. A D1 direction is a first direction and indicates lengthwise directions of the power storage apparatus 1 and the tubular casings 2. A D2 direction is a second direction and indicates height directions of the power storage apparatus 1 and the tubular casings 2. A D3 direction is a third direction and indicates crosswise directions of the power storage apparatus 1 and the tubular casings 2. The D1 direction, the D2 direction and the D3 direction are perpendicular to one another.

The tubular casings 2 are metal-made casings composed of metal materials such as aluminum, aluminum alloy, and extrusion molded articles formed by extrusion molding along the D1 direction. Each tubular casing 2 is formed into a rectangular tubular shape which is crosswise long with the crosswise length larger than its height. Since the tubular casings 2 as the extrusion molded articles can be easily formed and do not have joint parts where plate materials are joined together, they do not suffer variations in assembling or thermal distortions originated from such joint parts and their shapes are stable.

In the power storage apparatus 1 representing in the present embodiment, the two tubular casings 2 and 2 are arranged side by side in the crosswise direction of the tubular casings 2. Nevertheless, the power storage apparatus only has to have at least one tubular casing 2. Since the two tubular casings 2 and 2 have substantially the same structures, one of these tubular casings 2 is hereafter described.

As shown in FIG. 2, the tubular casing 2 has an upper wall part 21 and a lower wall part 22 as two outer wall parts arranged to face each other in the height direction, sidewall parts 23 and 23 as two outer wall parts arranged to face each other in the crosswise direction, and one partition wall part 24 provided to be parallel to the sidewall parts 23 and 23 inside the tubular casing 2. The partition wall part 24 connects the upper wall part 21 and the lower wall part 22 at a center part of the tubular casing 2 in the crosswise direction to extend in the D1 direction.

Two housing parts 20 and 20 housing two cell groups 3 and 3 are provided inside the tubular casing 2. The two housing parts 20 and 20 extend in the lengthwise direction of the tubular casing 2 with spaces enclosed by the upper wall part 21, the lower wall part 22, the sidewall parts 23 and 23 and the partition wall part 24, and are parallelly arranged to sandwich the partition wall part 24. Opening parts 20a and 20a which open with crosswise long rectangular shapes and allow the housing parts 20 and 20 to communicate with the outside are arranged at both end parts of the tubular casing 2 in the lengthwise direction.

Inside the sidewall parts 23 and 23 of the tubular casing 2 and inside the partition wall part 24 thereof, temperature control medium channels 25 and 26 are respectively provided through which a temperature control medium flows for its heat exchange with battery cells 31 mentioned later constituting the cell groups 3 and 3. The temperature control medium channels 25 and 26 extend over the total length of the tubular casing 2 in the lengthwise direction and open at both end parts of the tubular casing 2 in the lengthwise direction. The temperature control medium channels 25 and 26 are respectively partitioned into upper channels 25a and 26a and lower channels 25b and 26b by channel partitioning walls 251 and 261 extending over the tubular casing 2 in the lengthwise direction in substantially the center parts of the tubular casing 2 in the height direction. The upper channels 25a and 26a and the lower channels 25b and 26b are arranged side by side in the height direction of the tubular casing 2.

Figure 4:
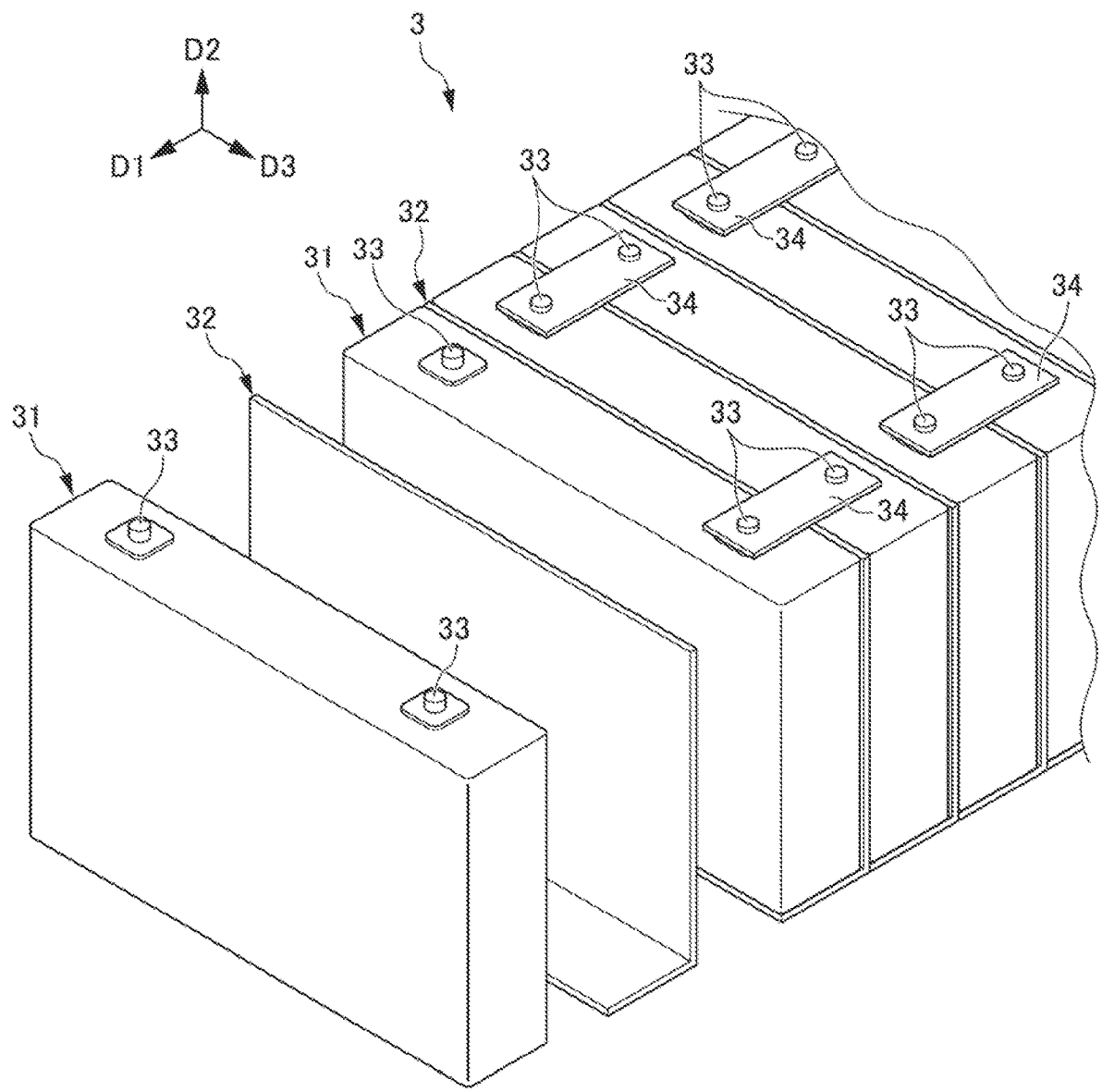
FIG. 4 is a perspective view showing a configuration of a cell group.

The cell groups 3 and 3 housed in the respective housing parts 20 and 20 of the tubular casing 2 are configured by stacking a plurality of battery cells 31 in rectangular solid Shapes, for example, composed of lithium ion secondary batteries along the D1 direction as shown in FIG. 4. Insulative separators 32 are arranged individually between the battery cells 31 and 31 adjacent in the stacking direction. Each battery cell 31 is configured by housing electrode bodies (not shown) in a cell casing composed of aluminum, aluminum alloy or the like. The battery cell 31 has a pair of positive and negative electrode terminals 33 and 33 on its upper face. The electrode terminals 33 and 33 of the battery cells 31 and 31 adjacent in the stacking direction are electrically connected together with each bus bar 34. Thereby, all the battery cells 31 constituting one cell group 3 are electrically connected in series or in parallel.

The cell groups 3 and 3 are inserted from the opening parts 20a and 20a of the tubular casing 2 along the D1 direction, which is the direction of stacking the battery cells 31, and housed in the housing parts 20 and 20, respectively. The cell groups 3 and 3 in the housing parts 20 and 20 are sandwiched between the sidewall parts 23 and the partition wall part 24. Therefore, although the two cell groups 3 and 3 are housed in this one tubular casing 2, they can efficiently make heat exchange with the temperature control medium flowing in the temperature control medium channels 25 and 26 on both sides of the battery cells 31 in the crosswise direction. The cell groups 3 and 3 may collectively bundled by a hot-shown tightening band or the like in order to maintain the state of stacking of the battery cells 31.

The end plates 4 and 5 are composed of plate-like members formed of metal materials such as aluminum, aluminum alloy into crosswise long shapes that can cover the opening parts 20a of the tubular casing 2. The end plates 4 and 5 close the opening parts 20a by coming into contact with end faces 2a of the tubular casing 2. As shown in FIG. 1, the end plates 4 are provided individually for the two tubular casings 2 and 2. The two end plates 4 and 4 are collectively coupled with a coupling member 40 between the tubular casings 2 and 2. The end plate 5 is provided commonly over the two tubular casings 2 and 2.

Each tubular casing 2 has bolt insertion holes 27 into which fastening bolts 8 which are first fastening members for fastening the end plates 4 and 5 are inserted, individually inside places where the upper wall part 21 and the sidewall parts 23 are connected, places where the lower wall part 22 and the sidewall parts 23 are connected, a place where the upper wall part 21 and the partition wall part 24 are connected and a place where the lower wall part 22 and the partition wall part 24 are connected. The bolt insertion holes 27 are formed by extrusion molding simultaneously through the extrusion molding of the tubular casing 2 and extend over the total length of the tubular casing 2 in the lengthwise direction. The end plates 4 and 5 are fixed onto the end faces 2a of the tubular casings 2 with the fastening bolts 8 which penetrate the end plates 4 and 5 and are inserted into the bolt insertion holes 27.

As shown in FIG. 1, onto lateral parts of the tubular casings 2 and 2, a plurality of brackets 100 are detachably attached for attaching the power storage apparatus 1 to a vehicle body frame (not shown) with bolts or the like.

Figure 3:
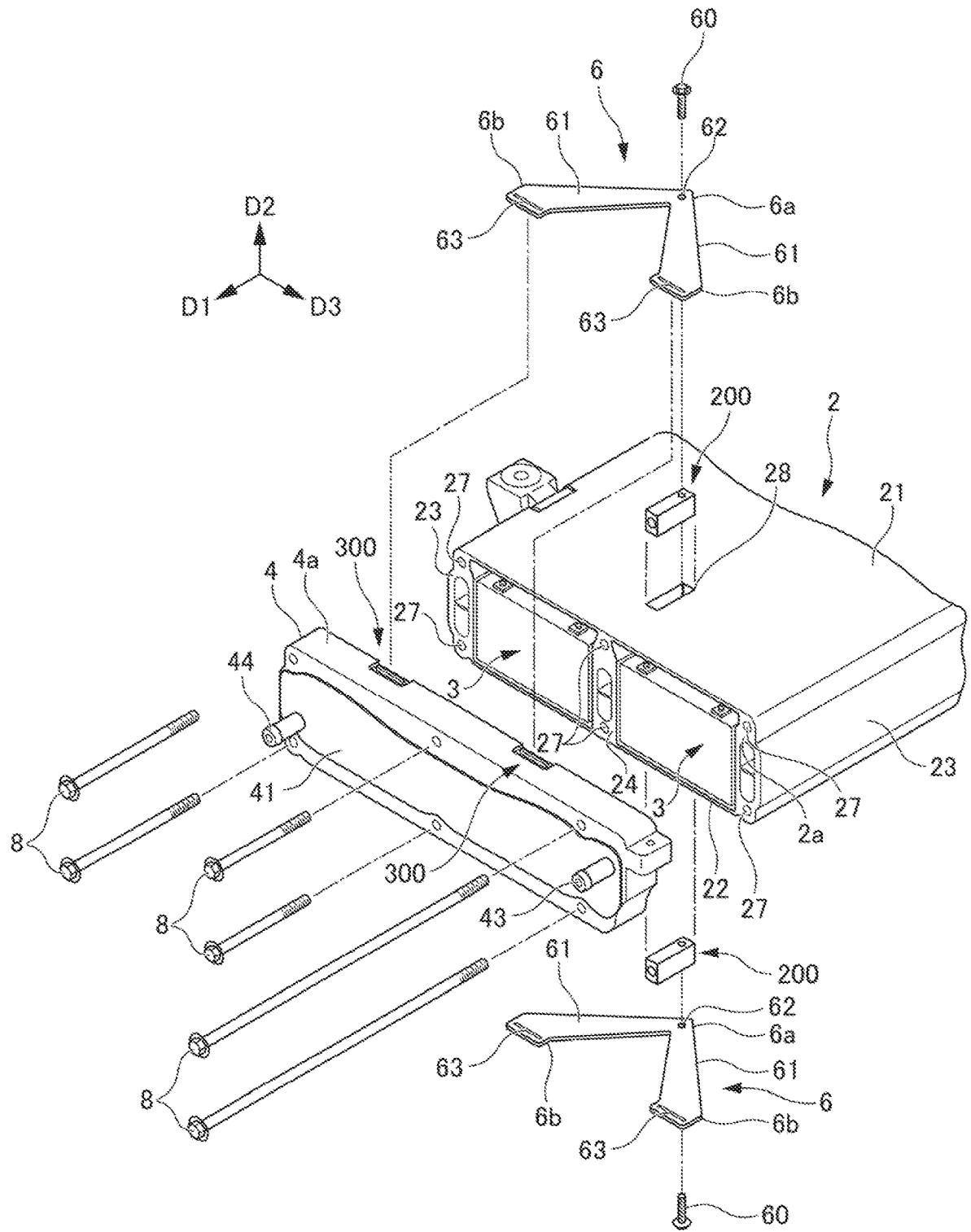
FIG. 3 is an exploded perspective view partially showing and having the power storage apparatus shown in FIG. 1 expanded.

As shown in FIG. 1 and FIG. 3, the reinforcement members 6 are arranged on the upper wall part 21 and the lower wall part 22, which are arranged in the D2 direction, among four outer wall parts of each tubular casing 2. The reinforcement members 6 are fixed across the upper wall parts 21 and the lower wall parts 22 of the tubular casings 2 and the end plates 4 and 5. Accordingly, one tubular casing 2 has four reinforcement members 6.

Figure 5:
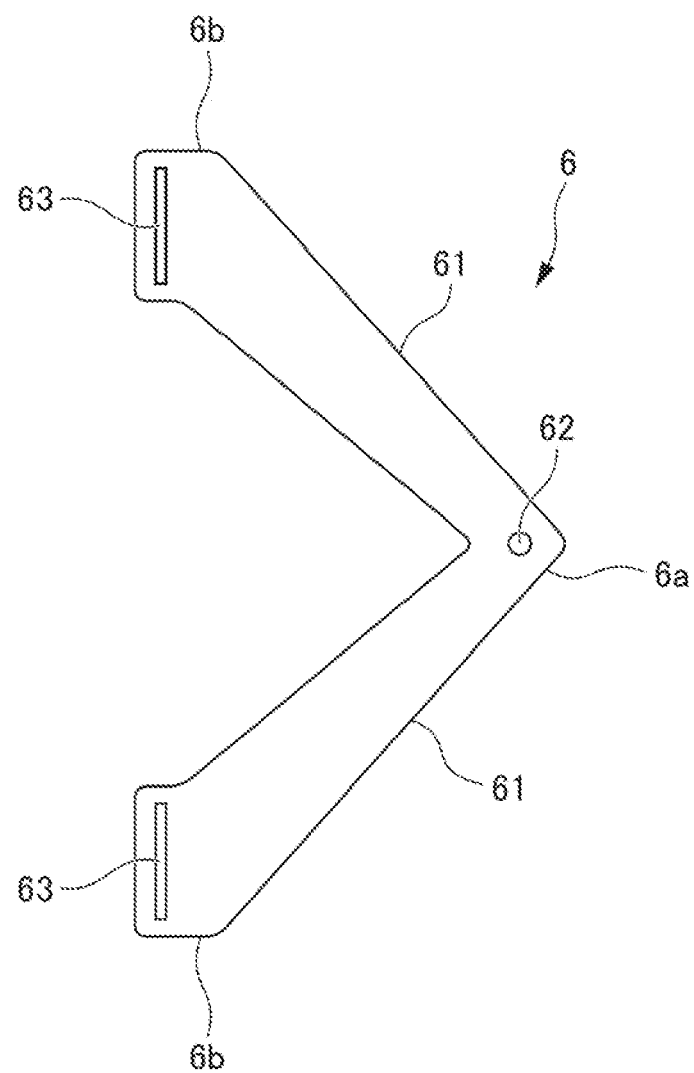
FIG. 5 is a plan view showing an embodiment of a reinforcement member.

As shown in FIG. 5, each reinforcement member 6 of the present embodiment is formed into a V shape having a pair of reinforcement arm parts 61 and 61 composed of metal plate materials. One end part 6a of the reinforcement member 6 is constituted of a place where the pair of reinforcement arm parts 61 and 61 are integrally coupled. The other end parts 6b and 6b of the reinforcement member 6 are constituted of tip parts of the pair of reinforcement arm parts 61 and 61 spreading into the V shape. The pair of reinforcement arm parts 61 and 61 have the same shapes. Therefore, the reinforcement member 6 has a symmetric shape on both sides of the one end part 6a. The number of reinforcement arm parts 61 provided for one reinforcement member 6 corresponds to the number of housing parts 20 in each tubular casing 2.

The one end part 6a of the reinforcement member 6 is fixed to each of first fixation parts 200 provided on the upper wall parts 21 and the lower wall parts 22 of the tubular casings 2. The other end parts 6b and 6b of the reinforcement members 6 are fixed to second fixation parts 300 provided on outer parts of the end plates 4 and 5. Specifically, the one end part 6a of the reinforcement member 6 has one through hole 62 allowing a reinforcement member fixation bolt 60 which is a second fastening member to penetrate for being fixed to the first fixation part 200. The other end parts 6b and 6b of the reinforcement member 6 respectively have engagement hole parts 63 and 63 in crosswise long slit shapes which engage with engagement projection parts 302 mentioned later provided in the second fixation parts 300 of the end plates 4 and 5.

Figure 6:
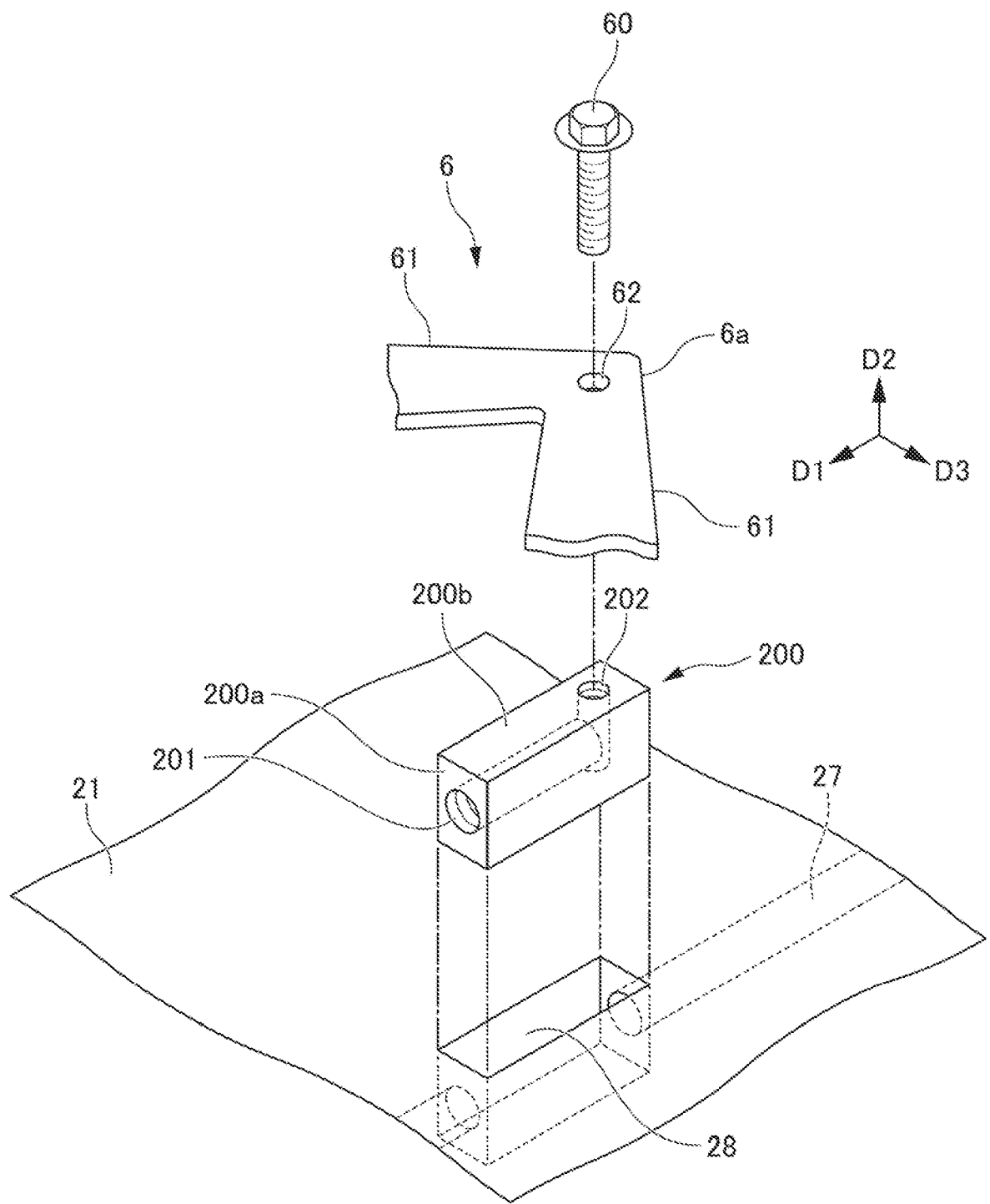
FIG. 6 is an exploded perspective view showing and having a structure of fixation of one end part of the reinforcement member to a first fixation part expanded.

The first fixation parts 200 are provided on the upper wall part 21 and the lower wall part 22, which are outer wall parts of the tubular casing 2. FIG. 6 shows and has a place of fixation with the first fixation part 200, among those, on the upper wall part 21 exploded. Since all the first fixation parts 200 provided in the tubular casing 2 have the same structures, the first fixation part 200 for fixing the one end part 6a of the reinforcement member 6 that is fixed across the end plate 4 and the upper wall part 21 of the tubular casing 2 is hereafter described. The following description also applies to the end plate 5 and the lower wall part 22 when the end plate 4 and the upper wall part 21 therein are respectively replaced by the end plate 5 and the lower wall part 22.

As shown in FIG. 3 and FIG. 6, the first fixation part 200 is provided separately from the tubular casing 2. Specifically, the first fixation part 200 is a block body in a rectangular solid shape composed of a metal material such as aluminum, aluminum alloy. As to the first fixation part 200, its height along the D2 direction is slightly larger than its width along the D3 direction. In the upper wall part 21 of the tubular casing 2, a fixation part accommodating groove 28 which the first fixation part 200 can be fitted into and which can accommodate the same is recessed from the surface of the upper wall part 21.

In the present embodiment, four first fixation parts 200 are provided for one tubular casing 2 since four reinforcement members 6 are provided for one tubular casing 2. The four fixation part accommodating grooves 28 corresponding to the number of first fixation parts 200 are arranged at places, on the upper wall part 21 and the lower wall part 22, near the end plates 4 and 5, specifically, at places, on the upper wall part 21 and the lower wall part 22, where the one end parts 6a of the reinforcement members 6 are arranged when the other end parts 6b and 6b of the reinforcement members 6 have been arranged on the outer parts of the end plates 4 and 5.

Figure 10:
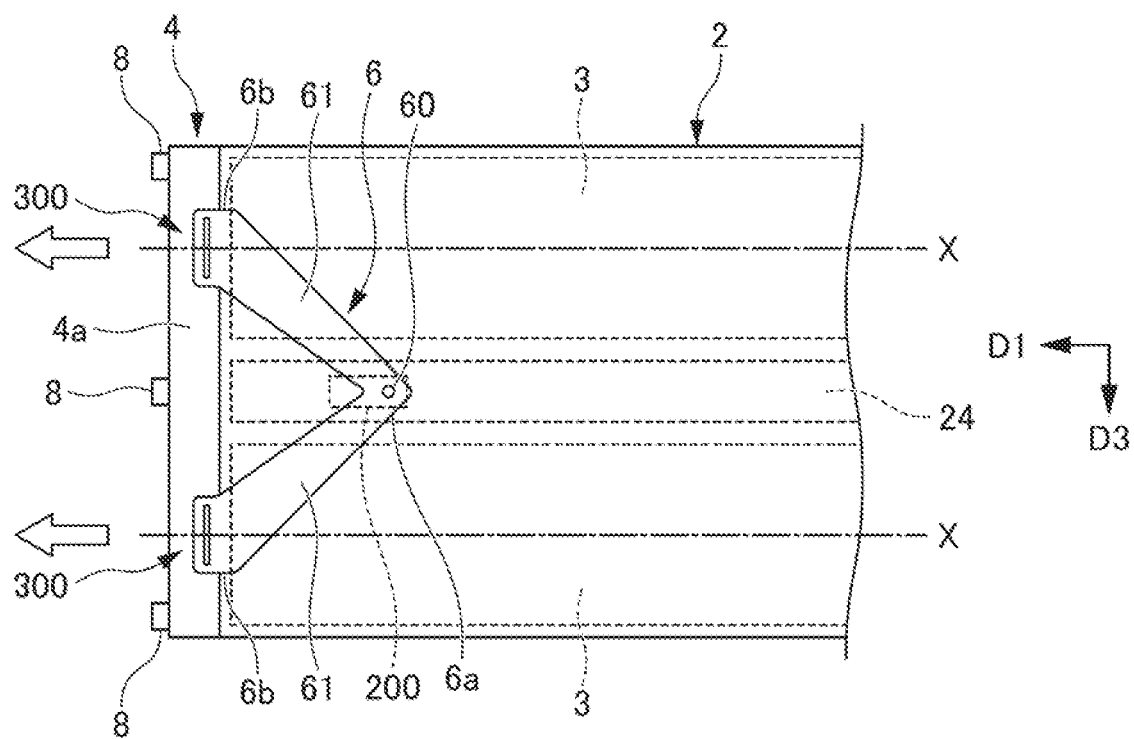
FIG. 10 is a plan view partially showing a tubular casing to which the reinforcement member is fixed.

More specifically, as shown in FIG. 10, the fixation part accommodating groove 28 is arranged at a place overlapping with the partition wall part 24 as the upper wall part 21 is viewed from the D2 direction. Since within the upper wall part 21, the place where the partition wall part 24 is provided has an enough wall thickness as compared with the other places, a groove having an enough depth to accommodate the first fixation part 200 composed of a block body can be easily formed there. This can prevent the tubular casing 2 from being heavy since the fixation part accommodating grooves 28 can be formed without thickening the other wall parts of the tubular casing 2.

Figure 7:
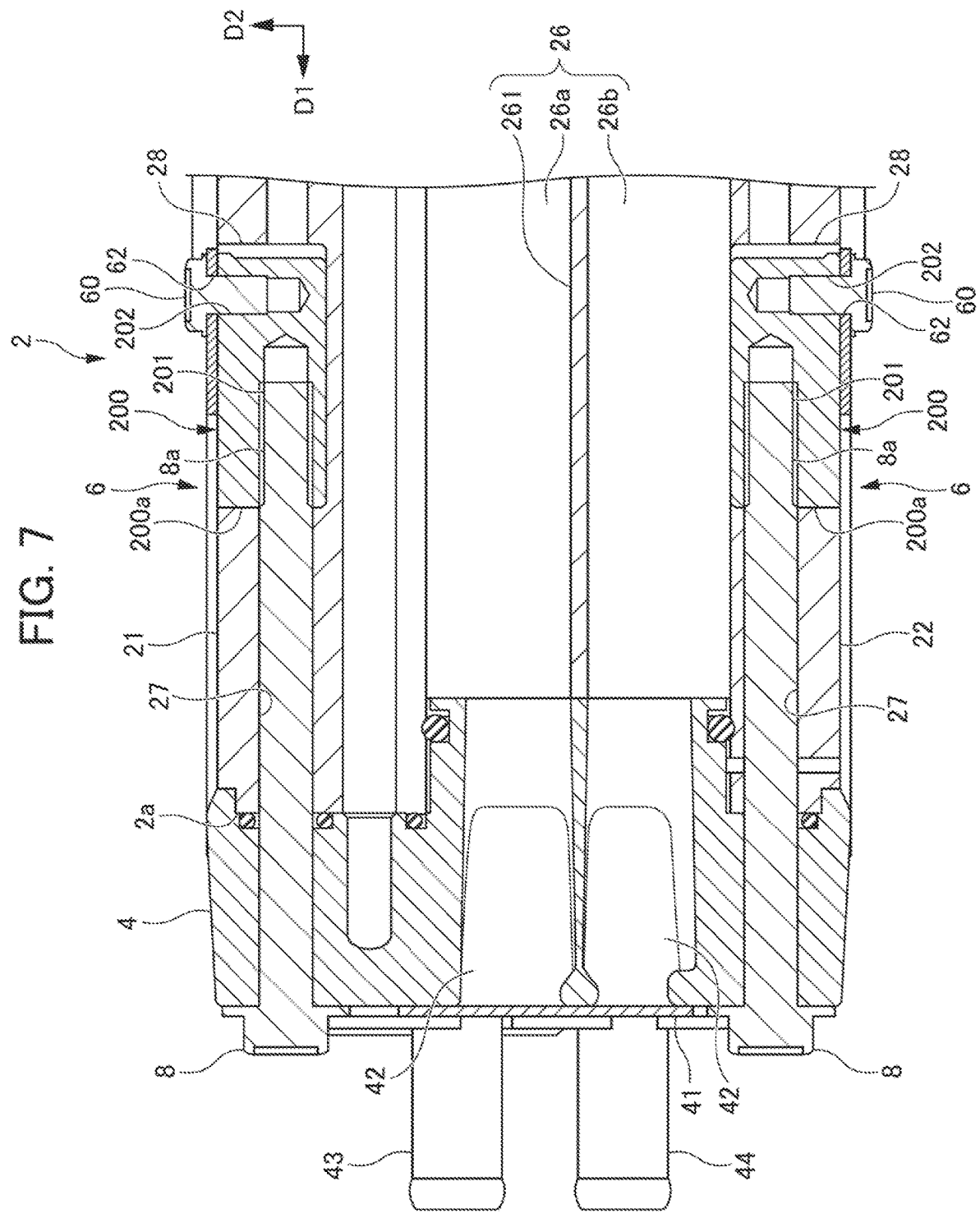
FIG. 7 is a sectional view taken along the A-A line in FIG. 1.

As shown in FIG. 6 and FIG. 7, the depth of the fixation part accommodating groove 28 provided at the place overlapping with the partition wall part 24 is a depth enough to traverse, along the D2 direction, the bolt insertion hole 27 provided at the place where the upper wall part 21 and the partition wall part 24 are connected. Accordingly, the fixation part accommodating groove 28 communicates with the bolt insertion hole 27.

As shown in FIG. 6, the first fixation part. 200 has a first threaded engaging part 201 composed of a female screw hole on a lateral face 200a arranged in the D1 direction. The first threaded engaging part 201 is provided along the D1 direction so as to communicate with the bolt insertion hole 27 when accommodated in the fixation part accommodating groove 28. The first fixation part 200 has a second threaded engaging part 202 composed of a female screw hole on a lateral face 200b arranged to be flush with the surface of the upper wall part 21 when accommodated in the fixation part accommodating groove 28. The second threaded engaging part 202 is a place of threadedly engaging with the reinforcement member fixation bolt 60 penetrating the through hole 62 at the one end part 6a of the reinforcement member 6. The second threaded engaging part 202 is provided along the D2 direction on the far side of the first threaded engaging part 201 from the end plate 4.

As shown in FIG. 6 and FIG. 7, the first fixation part 200 is fitted into and accommodated in the fixation part accommodating groove 28 of the tubular casing 2 in which the cell groups 3 and 3 are housed, in its posture in which the lateral face 200a on which the first threaded engaging part 201 is provided is oriented toward the end plate 4 and the lateral face 200b on which the second threaded engaging part. 202 is provided is flush with the upper wall part 21. Thereby, the first threaded engaging part 201 of the first fixation part 200 communicates with the bolt insertion hole 27 communicating with the fixation part accommodating groove 28.

After that, the fastening bolt 8 penetrating the end plate 4 is inserted into the bolt insertion hole 27. A tip 8a of the fastening bolt 8 having reached the fixation part accommodating groove 28 threadedly engages with the first threaded engaging part 201 of the first fixation part 200. The first fixation part 200 functions as a nut for the fastening bolt 8, and thereby, the end plate 4 is fastened and fixed onto the end face 2a of the tubular casing 2. Simultaneously, the first fixation part 200 is also fixed in the fixation part accommodating groove 28 with the fastening bolt 8.

As above, the first fixation parts 200 provided separate from the tubular casing 2 are accommodated in the fixation part accommodating grooves 28 provided in the upper wall part 21 and the lower wall part 22 of the tubular casing 2, and this makes fixation parts for fixing the one end parts 6a of the reinforcement members 6, with respect to the upper wall part 21 and the lower wall part 22 of the tubular casing 2. Since the tubular casing 2 is formed by extrusion molding, the bolt insertion holes 27 are also provided over the total length of the tubular casing 2. Therefore, since bolts for fixing the reinforcement members 6 to the upper wall part 21 and the lower wall part 22 interfere with the bolt insertion holes 27, female screw holes with enough length are difficult to provide in the direction intersecting the bolt insertion holes 27 without thickening the wall parts. Nevertheless, according to the present embodiment, the first fixation parts 200 provided separately from the tubular casing 2 are collectively fastened to the end plates 4 and 5 with the fastening bolts 8 in the fixation part accommodating grooves 28, and this can easily make fixation parts for fixing the one end parts 6a of the reinforcement members 6. This can also eliminate a need for thickening the wall parts of the tubular casing 2, and hence, can eliminate increases in the size and the weight of the tubular casing 2. The first fixation parts 200 can be easily assembled and taken apart since the first fixation parts 200 do not need to be fixed with exclusive fastening members.

Figure 8:
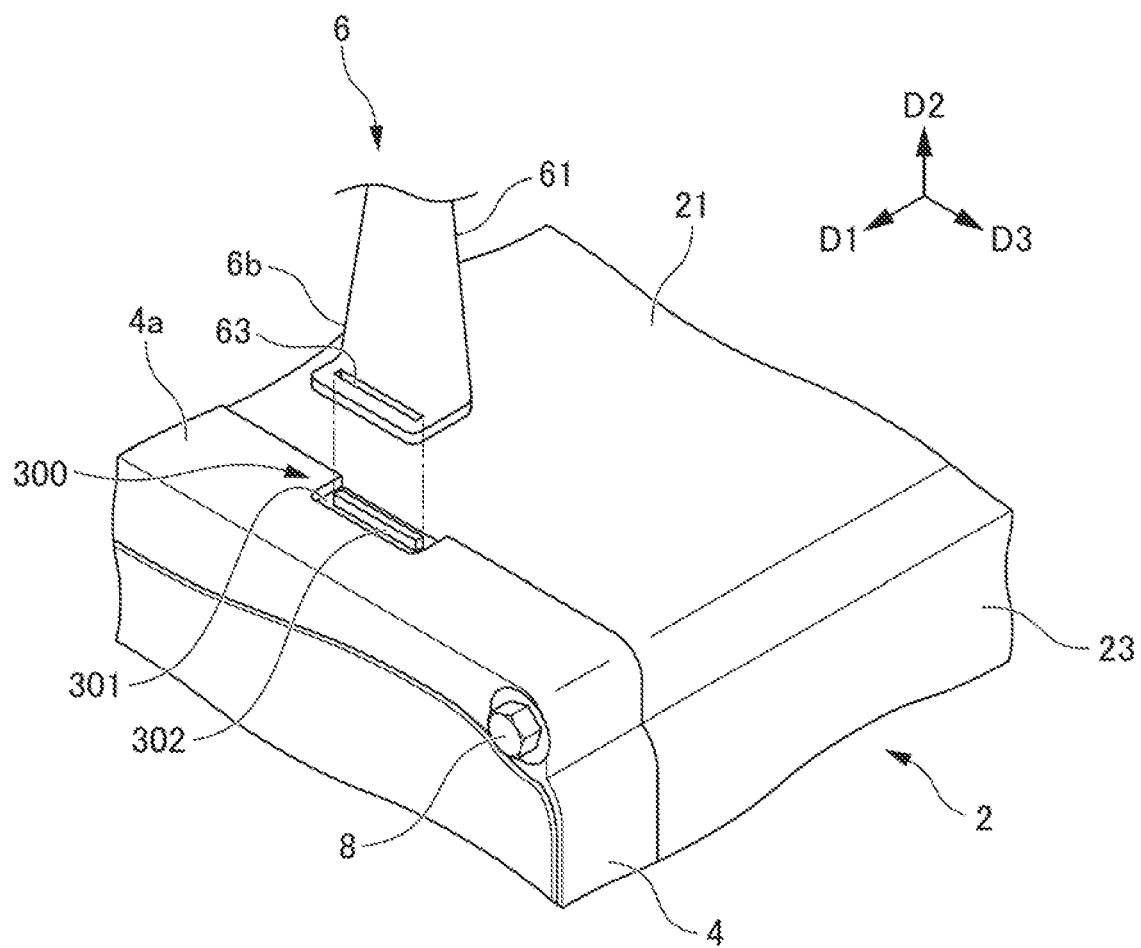
FIG. 8 is an exploded perspective view showing and having a structure of fixation of another end part of the reinforcement member to a second fixation part expanded.

The second fixation parts 300 are provided on outer parts of the end plates 4 and 5. FIG. 7 and FIG. 8 show and have one second fixation part 300 for the upper wall part 21 among those exploded. Since all the second fixation parts 300 provided in the end plates 4 and 5 have the same structures, the one second fixation part 300 for fixing the other end part 6b of the reinforcement member 6 that is fixed across the end plate 4 and the upper wall part 21 of the tubular casing 2 is hereafter described. The following description also applies to the end plate 5 and the lower wall part 22 when the end plate 4 and the upper wall part 21 therein are respectively replaced by the end plate 5 and the lower wall part 22.

Figure 9:
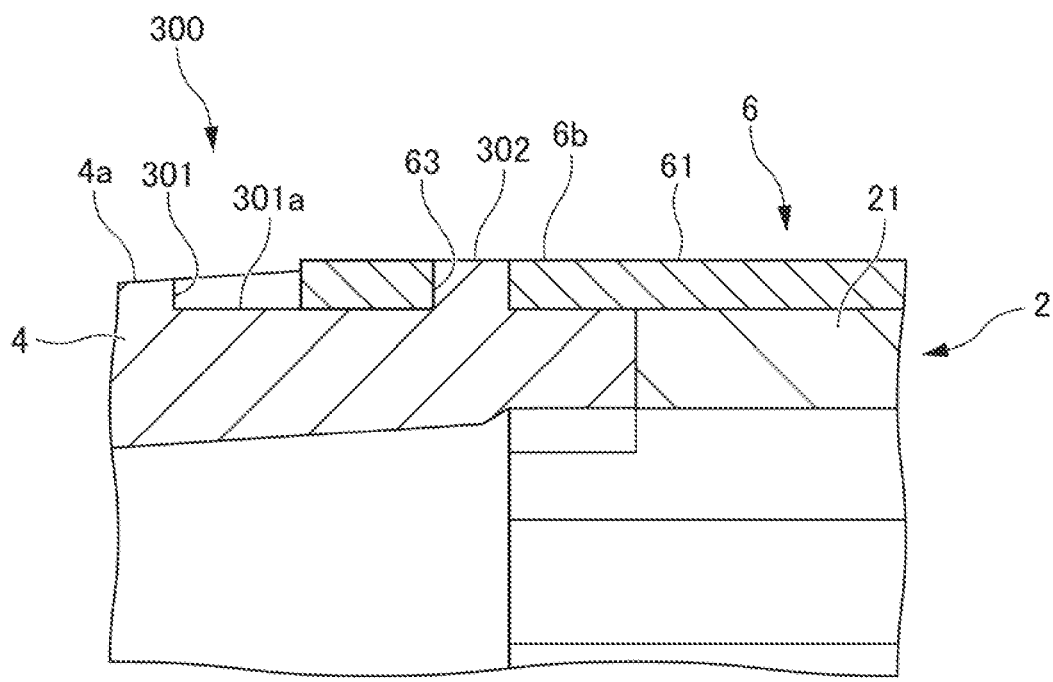
FIG. 9 is a sectional view taken along the B-B line in FIG. 1.

As shown in FIG. 8 and FIG. 9, the second fixation part 300 is provided on an outer part of the end plate 4. Specifically, the second fixation part 300 is provided on a lateral face 4a, of the outer circumferential part of the end plate 4, which is arranged in the same direction as the direction in which the upper wall part 21 is arranged in the tubular casing 2. One reinforcement member 6 has two other end parts 6b and 6b. Therefore, as shown in FIG. 3, two second fixation parts 300 are provided on the same lateral face 4a of the end plate 4 to be spaced from each other by the distance corresponding to the two other end parts 6b and 6b.

Each second fixation part 300 has a recess part 301 recessed from the lateral face da. The planar shape of the recess part 301 is substantially equal to the planar shape of the other end part 6b of the reinforcement member 6 and has a shape which can accommodate the other end part 6b. The recess part 301 opens toward the tubular casing 2. Specifically, the lateral face 4a of the end plate 4 is arranged at a position slightly higher along the D2 direction than the surface of the upper wall part 21 of the tubular casing 2. The depth of the recess part 301 from the lateral face 4a is a depth at which a bottom face 301a of the recess part 301 is substantially flush with the surface of the upper wall part 21 of the tubular casing 2.

Each second fixation part 300 has the engagement projection part 302 projecting from the bottom face 301a of the recess part 301 along the D2 direction. The engagement projection parts 302 have shapes with which they can engage with the engagement hole parts 63 and 63 by being fitted into those provided in the other end parts 6b and 6b of the reinforcement member 6. Specifically, each engagement projection part 302 is formed into a thin plate shape long in the D3 direction. The height of projection of the engagement projection part 302 is substantially equal to the depth of the recess part 301 and is substantially equal to the thickness of the other end part 6b of the reinforcement member 6.

As shown in FIG. 3, the second fixation parts 300 are provided on the lateral face 4a, of the end plate 4, which is arranged in the same direction as the face on which the upper wall part 21 is arranged. Therefore, the reinforcement member 6 can be formed into a flat plate shape and can be easily produced. Since when a load is exerted on the end plate 4, the reinforcement member 6 only receives the force in its planar direction, it can strongly restrain the end plate 4 from deforming due to the large load caused by the expansion of the cell groups 3 and 3.

The reinforcement member 6 is fixed to the first fixation part 200 and the second fixation parts 300 by the method described below. First, the engagement hole parts 63 and 63 of the other end parts 6b and 6b of the reinforcement member 6 are fitted to the engagement projection parts 302 and 302 of the pair of second fixation parts 300 and 300 provided on the lateral face 4a of the end plate 4. Thereby, the other end parts 6b and 6b of the reinforcement member 6 is locked and fixed by the second fixation parts 300 and 300.

The first fixation part 200 is arranged at a position which corresponds to the one end part 6a of the reinforcement member 6 when the other end parts 6b and 6b of the reinforcement member 6 have been fixed to the second fixation parts 300 and 300. In this stage, the position of the through hole 62 of the one end part 6a in the reinforcement member 6 coincides with the position of the second threaded engaging part 202 of the first fixation part 200. After that, the reinforcement member fixation bolt 60 penetrates the through hole 62 to threadedly engage with the second threaded engaging part 202 of the first fixation part 200. Thereby, the one end part 6a of the reinforcement member 6 is fastened to the first fixation part 200 and fixed onto the lateral face 200b of the first fixation part 200.

By fixing the reinforcement members 6 across all the first fixation parts 200 of the tubular casings 2 and all the second fixation parts 300 of the end plates 4 and 5, as shown in FIG. 1, the states where the tubular casings 2 and the end plates 4 and 5 are fastened together are reinforced by the reinforcement members 6. Therefore, even when a large load due to the expansion of the cell groups 3 and 3 acts on the end plates 4 and 5, the reinforcement members 6 strongly restrain the end plates 4 and 5 from deforming outward. Accordingly, overexpansion of the cell groups 3 and 3 can be restrained and failure such as breakage of the battery cells 31 can be prevented from occurring.

As shown in FIG. 10, each second fixation part 300 is arranged, in the end plate 4, on a center line X of each of the cell groups 3 and 3 in the tubular casing 2 in the crosswise direction (D3 direction). Since the centers of the cell groups 3 and 3 in the crosswise direction most strongly exert the large load due to the expansion of the cell groups 3 and 3 on the end plate 4, such places, of the end plate 4, which are arranged on the center lines X are the places most liable to deform within the end plate 4. By arranging the second fixation parts 300 and 300 at these places, the reinforcement members 6 can effectively restrain the end plate 4 from deforming when the large load due to the expansion of the cell groups 3 and 3 acts on the end plate 4.

As shown in FIG. 5 and FIG. 10, a reinforcement member 6 is formed in axial symmetry with the partition wall part 24 as the tubular casing 2 is viewed from the D2 direction perpendicular to the upper wall part 21. When the position of one first fixation part 200 fixing the reinforcement member 6 in the V shape and the positions of two second fixation parts 300 and 300 do not coincide with one another in the D1 direction, which is the stacking direction in the cell groups 3 and 3, this may cause a concern that a moment out of balance may arise between the other end parts 6b and 6b of the reinforcement member 6 when the large load due to the expansion of the cell groups 3 and 3 acts on the reinforcement member 6 via the end plate 4. This, in turn, leads to a concern that the reinforcement member 6 may rotate around the reinforcement member fixation bolt 60 as the center, Nevertheless, the reinforcement member 6 is formed in the axial symmetry, thereby, moments substantially equally arise on the two other end parts 6b and 6b of the reinforcement member 6 when the load is exerted on the end plate 4 as indicated by void arrows in FIG. 10, and hence, the reinforcement member 6 is restrained from rotating. Therefore, the reinforcement member 6 can strongly restrain the end plate 4 from deforming.

The other end parts 6b and 6b of the reinforcement member 6 are fixed to the second fixation parts 300 and 300 simply by causing the engagement hole parts 63 to engage with the engagement projection parts 302. Use of an exclusive jig as in the case of bolt fastening is not necessary. Therefore, the reinforcement member 6 can be easily fixed across the end plate 4 and the tubular casing 2 simply by causing one reinforcement member fixation bolt 60 to threadedly engage with the first fixation part 200, which realizes excellent workability.

Figure 11:
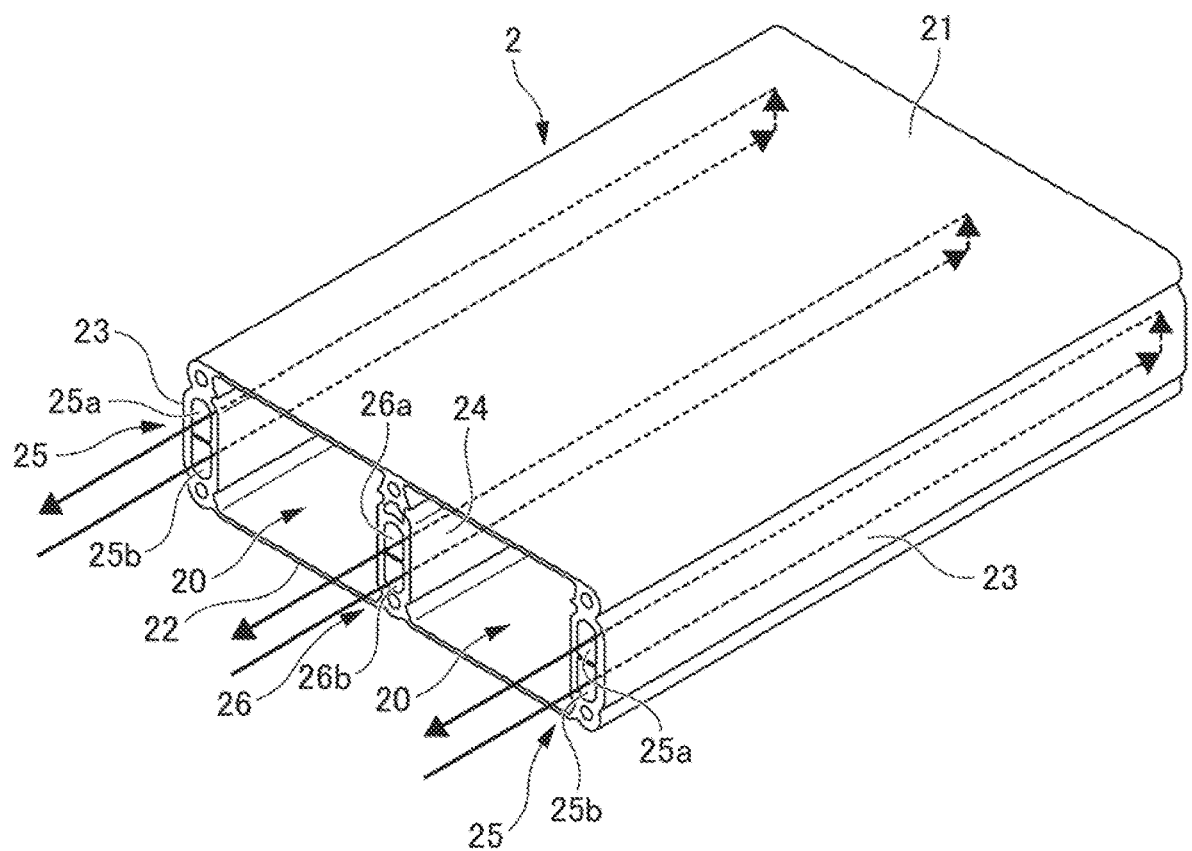
FIG. 11 is a perspective view showing flows of a temperature control medium in the tubular casing.

As shown in FIG. 1 and FIG. 3, channel members 41 which cause the temperature control medium channels 25 and 26 of the tubular casings 2 to communicate with one another are provided on the respective outer surfaces of the end plates 4 individually provided for the tubular casings 2 and 2. As shown in FIG. 7, each channel member 41 communicates with the temperature control medium channels 25 and 26 of the tubular casing 2 via through channels 42 and 42 penetrating the end plate 4. A flow inlet 43 and a flow outlet 44 for the temperature control medium are provided on the channel member 41. The temperature control medium flowing in from the flow inlet 43 to each tubular casing 2 flows in the temperature control medium channels 25 and 26 in one direction as indicated by arrows in FIG. 11 via the channel member 41 and the through channel 42, goes through the through channel 42 and the channel member 41 again, and flows out to the outside from the flow outlet 44.

Thereby, the temperature of the battery cells 31 in the tubular casings 2 is controlled with the temperature control medium flowing in the temperature control medium channels 25 and 26 and an appropriate temperature of those is maintained. Therefore, the progress of deterioration of the battery cells 31 can be slowed and the battery cells 31 can be restrained from expanding. Note that FIG. 11 omits the end plates 4 and 5, the cell groups 3 and the reinforcement members 6 from the illustration.

Although each tubular casing 2 presented for the present embodiment has the two housing parts 20 and 20 and can house the two cell groups 3 and 3, at least one cell group 3 only has to be housed in the tubular casing 2. Nevertheless, when a tubular casing is configured so as to house the two cell groups 3 and 3 sandwiching the partition wall part 24 as in the case of the tubular casing 2 presented for the present embodiment, the first fixation parts 200 can be easily provided at places overlapping with the partition wall part 24 on the upper wall part 21 and the lower wall part 22 as above without thickening the wall parts.

EXPLANATION OF REFERENCE NUMERALS

1 Power storage apparatus
2 Tubular casing
20 Housing part
20a Opening part
21 Upper wall part (outer wall part)
22 Lower wall part (outer wall part)
24 Partition wall part
25, 26 Temperature control medium channel
27 Bolt insertion hole
28 Fixation part accommodating groove
3 Cell group
31 Battery cell
4, 5 End plate
4a Lateral face (outer part)
6 Reinforcement member
6a One end part
6b Another end part
60 Reinforcement member fixation bolt (second fastening member)
63 Engagement hole part
8 Fastening bolt (first fastening member)
200 First fixation part
201 First threaded engaging part
300 Second fixation part
302 Engagement projection part
X Center Line

What is claimed is:

1. A power storage apparatus comprising:
a tubular casing extending in a first direction;
a cell group configured by stacking a plurality of battery cells in the first direction;
opening parts arranged at both ends of the tubular casing in the first direction;
a housing part arranged inside the tubular casing and housing the cell group;
an end plate fixed to the tubular casing so as to close the opening part; and
a reinforcement member fixed across the tubular casing and the end plate, wherein
the tubular casing includes two outer wall parts arranged in a second direction perpendicular to the first direction,
one end part of the reinforcement member is fixed to a first fixation part provided on the two outer wall parts,
another end part of the reinforcement member is fixed to a second fixation part provided on an outer part of the end plate,
the first fixation part is provided separately from the tubular casing,
the two outer wall parts of the tubular casing have a fastening member insertion hole through which a first fastening member that fixes the end plate to the tubular casing is inserted along the first direction, and a fixation part accommodating groove that communicates with the fastening member insertion hole and accommodates the first fixation part,
the first fixation part has a threaded engaging part engaging with the first fastening member and is fixed to the two outer wall parts by causing the first fastening member inserted through the fastening member insertion hole to threadedly engage with the threaded engaging part in a state where the first fixation part is accommodated in the fixation part accommodating groove.

2. The power storage apparatus according to claim 1, wherein the second fixation part is arranged on a center line of the cell group in a third direction perpendicular to the first direction and the second direction.

3. The power storage apparatus according to claim 1, wherein
the one end part of the reinforcement member is fixed to the first fixation part with a second fastening member, the other end part of the reinforcement member has an engagement hole part, and the second fixation part has an engagement projection part that fixes the other end part by engaging with the engagement hole part of the reinforcement member.

4. The power storage apparatus according to claim 1, wherein the second fixation part is arranged on a lateral face, of the outer part of the end plate, that is arranged in the same direction as a direction in which the two outer wall parts having the first fixation part are arranged.

5. A power storage apparatus comprising:
a tubular casing extending in a first direction;
a cell group configured by stacking a plurality of battery cells in the first direction;
opening parts arranged at both ends of the tubular casing in the first direction;
a housing part arranged inside the tubular casing and housing the cell group;
an end plate fixed to the tubular casing so as to close the opening part; and
a reinforcement member fixed across the tubular casing and the end plate, wherein
the tubular casing includes two outer wall parts arranged in a second direction perpendicular to the first direction,
one end part of the reinforcement member is fixed to a first fixation part provided on the two outer wall parts,
another end part of the reinforcement member is fixed to a second fixation part provided on an outer part of the end plate,
the tubular casing has therein a partition wall part connecting the two outer wall parts and extending in the first direction, and
the first fixation part is arranged at a place, on the two outer wall parts, overlapping the partition wall part.

6. The power storage apparatus according to claim 5, wherein
two of the housing parts are arranged side by side to sandwich the partition wall part,
the reinforcement member has the one end part and two of the other end parts corresponding to the number of the housing parts, and
the reinforcement member is formed in axial symmetry with the partition wall part as viewed from the second direction.

7. The power storage apparatus according to claim 5, wherein the partition wall part has a temperature control medium channel in which a temperature control medium flows in the first direction.

* * * * *